April 17, 1934.  A. DINA  1,955,379
FRAMING MECHANISM FOR MOTION PICTURE PROJECTORS
Filed July 2, 1930  9 Sheets-Sheet 1

INVENTOR
Augusto Dina
BY
Austin + Dix
ATTORNEYS

April 17, 1934. A. DINA 1,955,379
FRAMING MECHANISM FOR MOTION PICTURE PROJECTORS
Filed July 2, 1930  9 Sheets-Sheet 2

INVENTOR
Augusto Dina
BY
Austin & Dix
ATTORNEYS

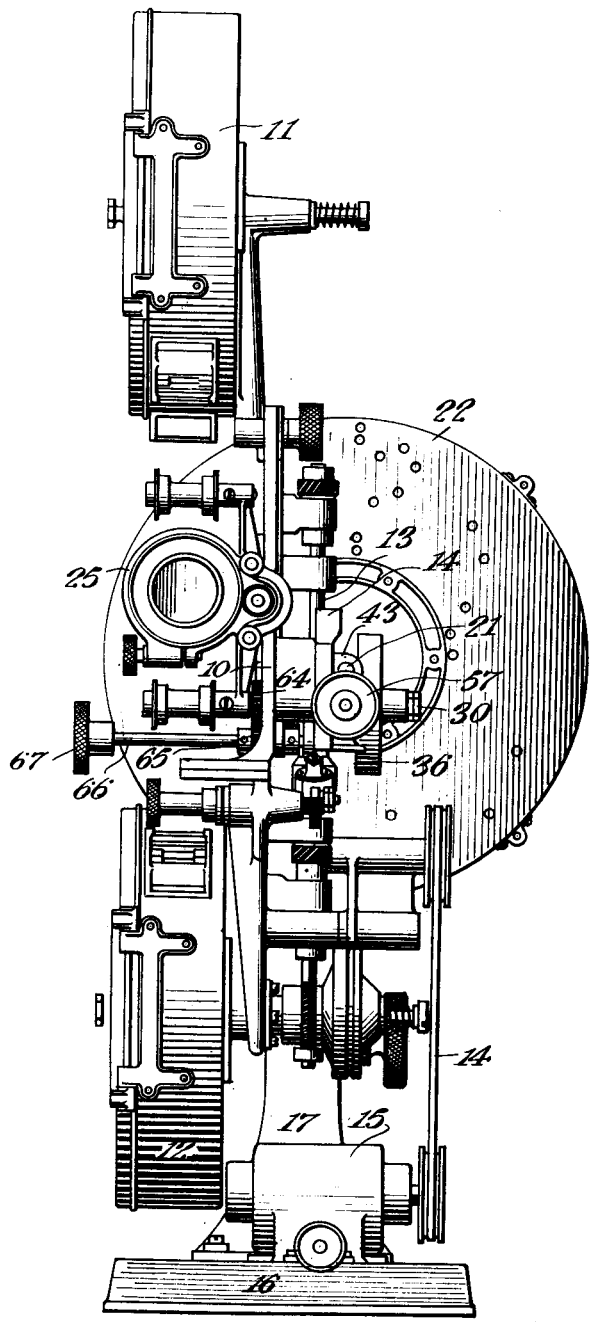

April 17, 1934. A. DINA 1,955,379
FRAMING MECHANISM FOR MOTION PICTURE PROJECTORS
Filed July 2, 1930  9 Sheets-Sheet 4
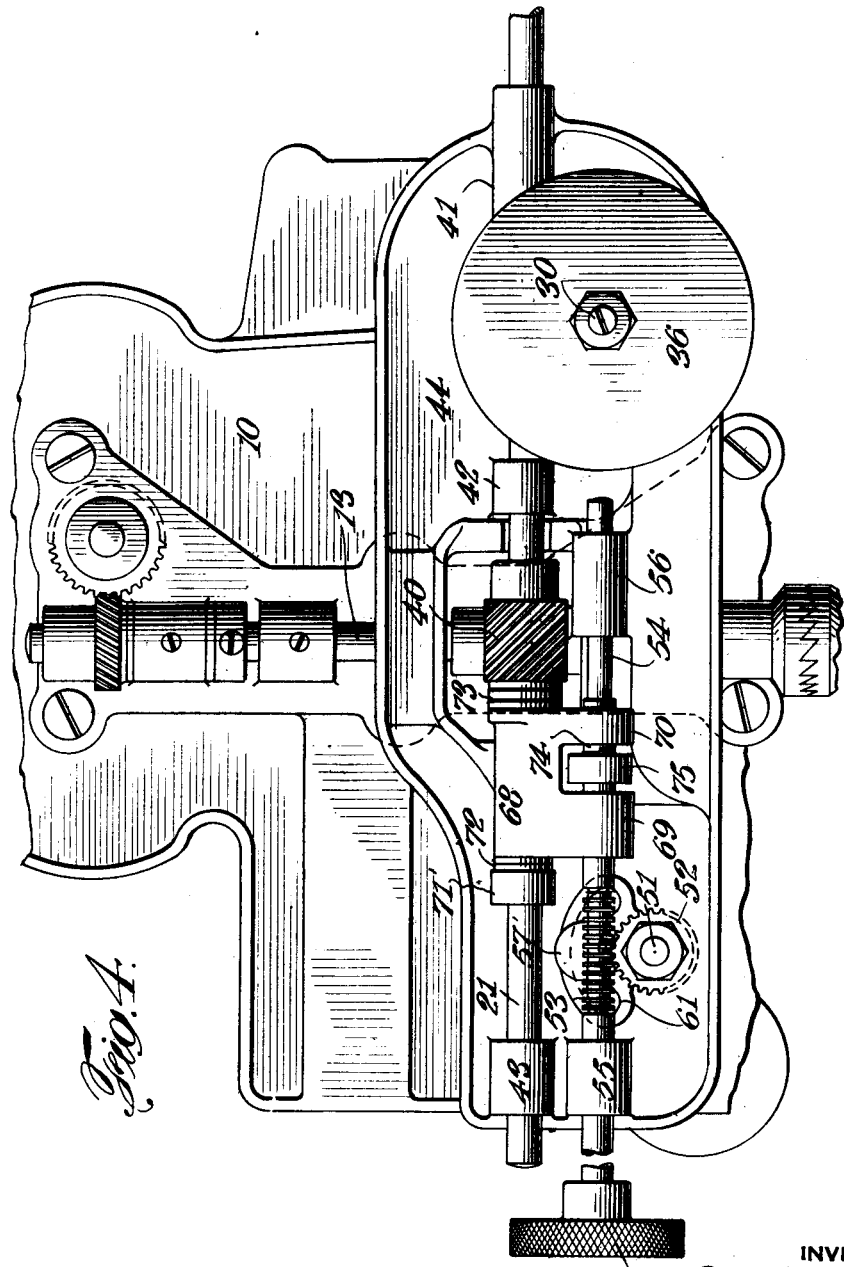
INVENTOR
*Augusto Dino*
BY
*Austin & Dix*
ATTORNEYS

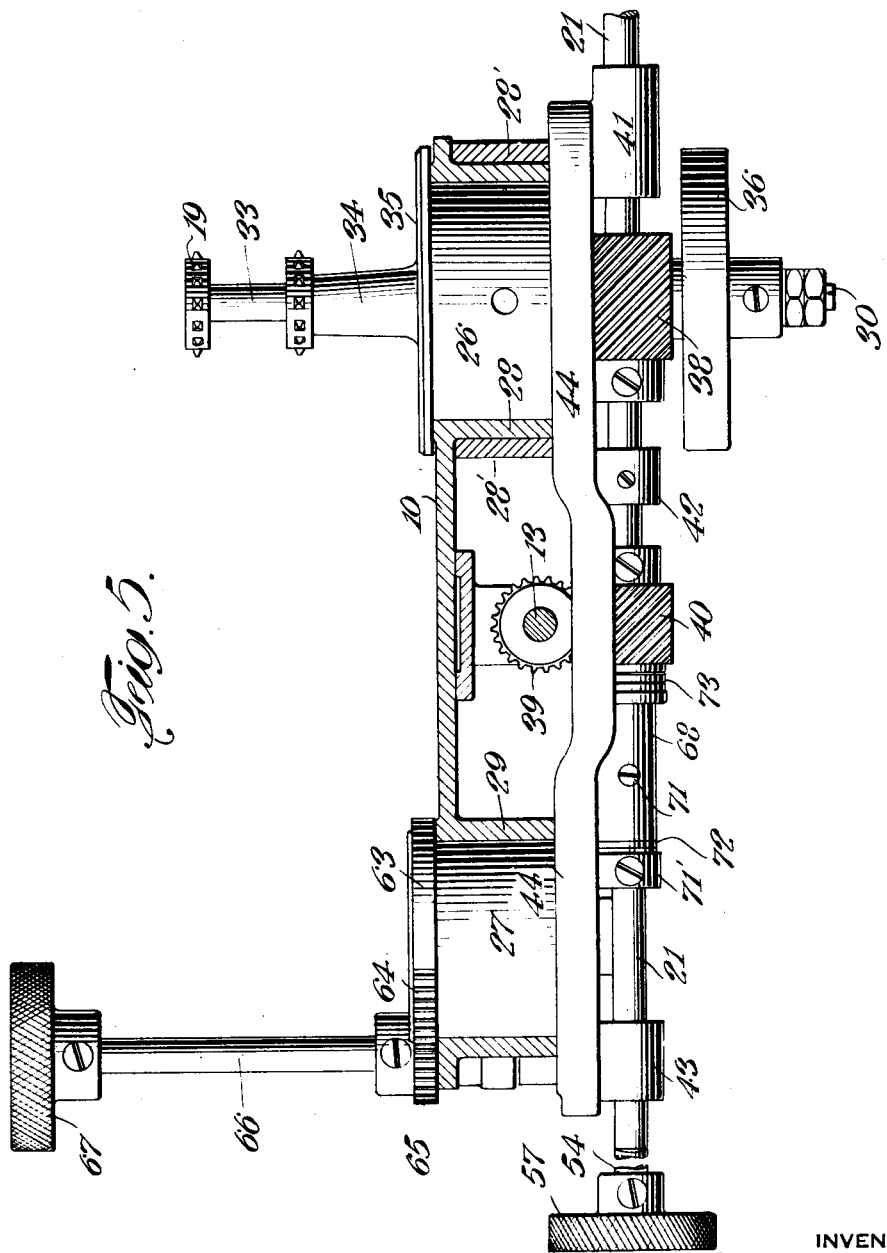

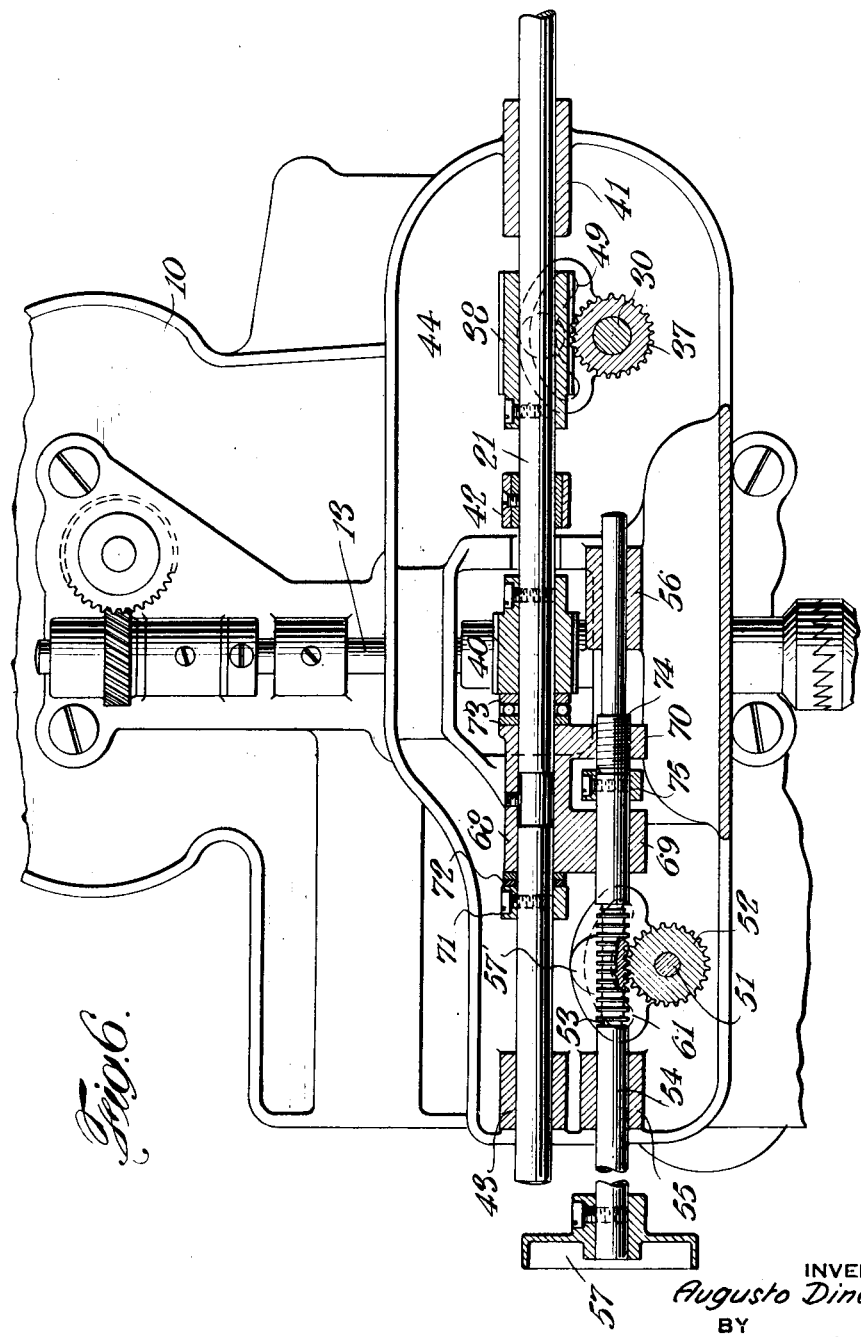

April 17, 1934.  A. DINA  1,955,379
FRAMING MECHANISM FOR MOTION PICTURE PROJECTORS
Filed July 2, 1930  9 Sheets-Sheet 7
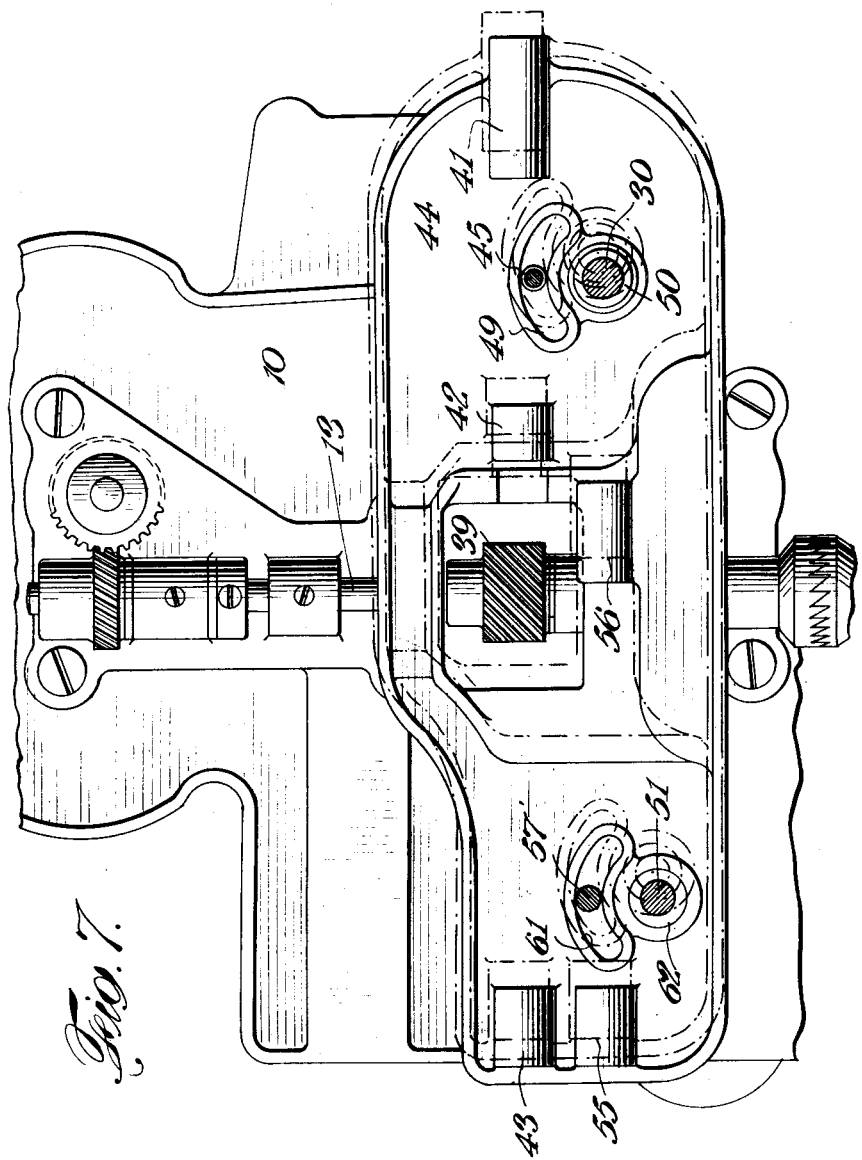
INVENTOR
Augusto Dina
BY
Austin + Dix
ATTORNEYS

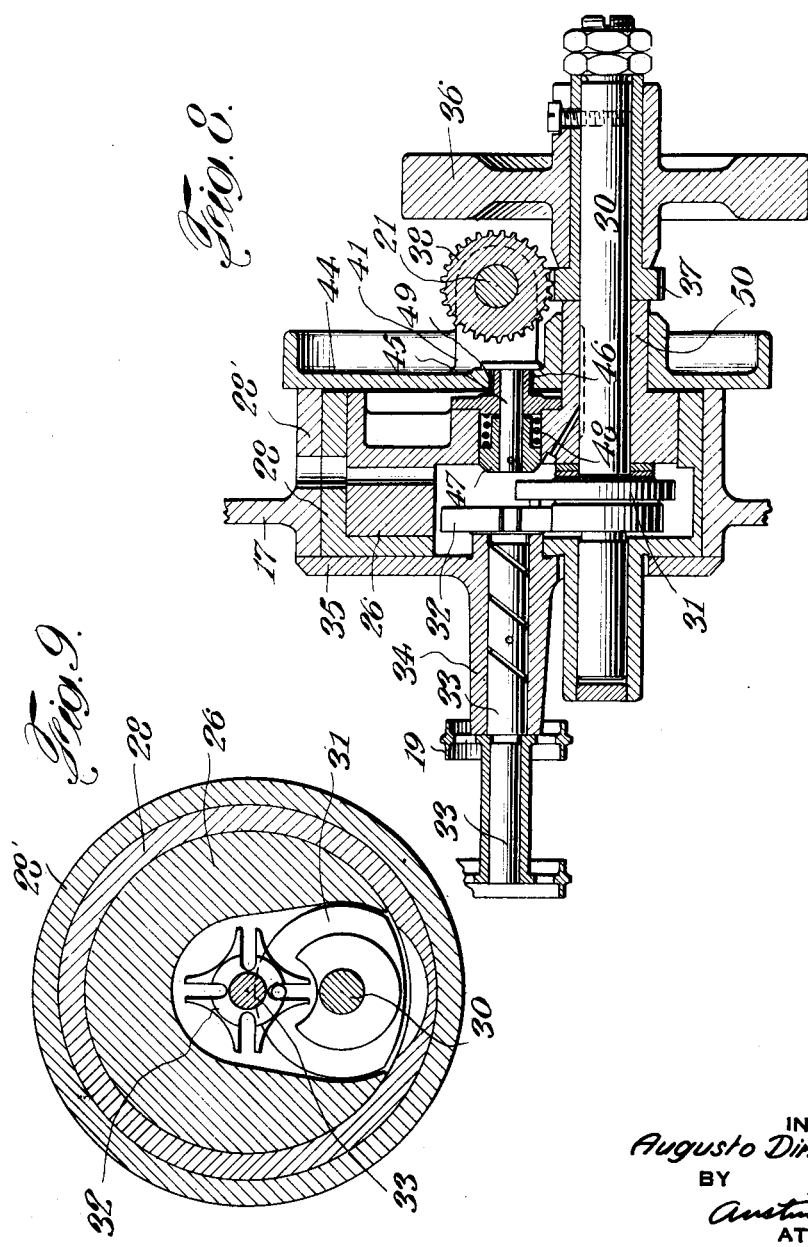

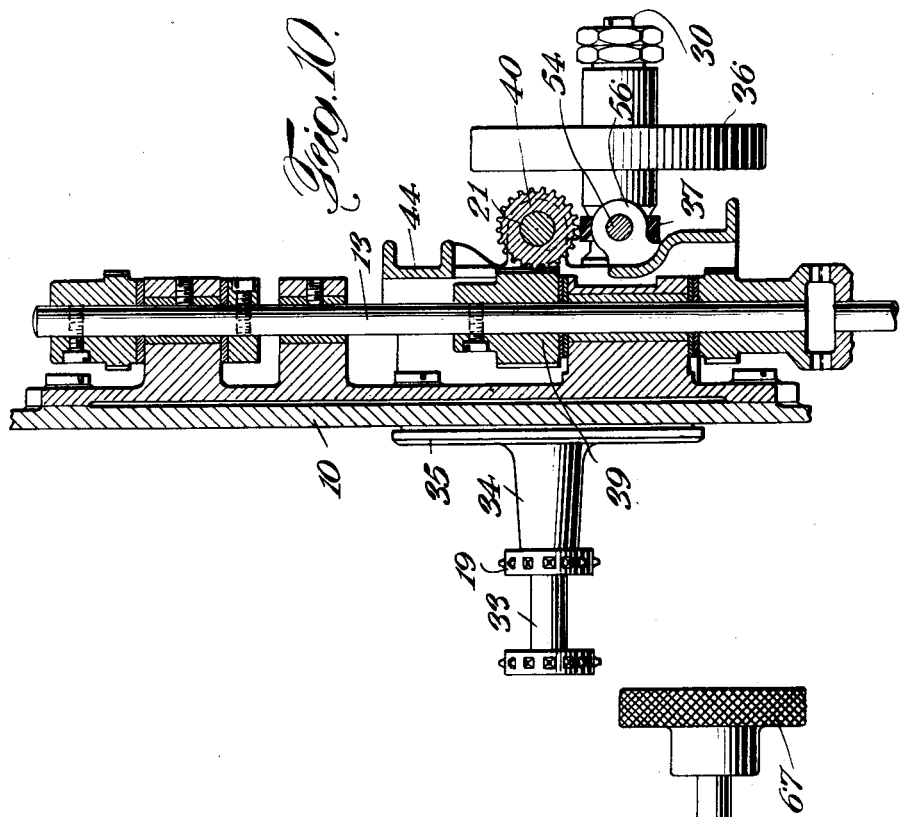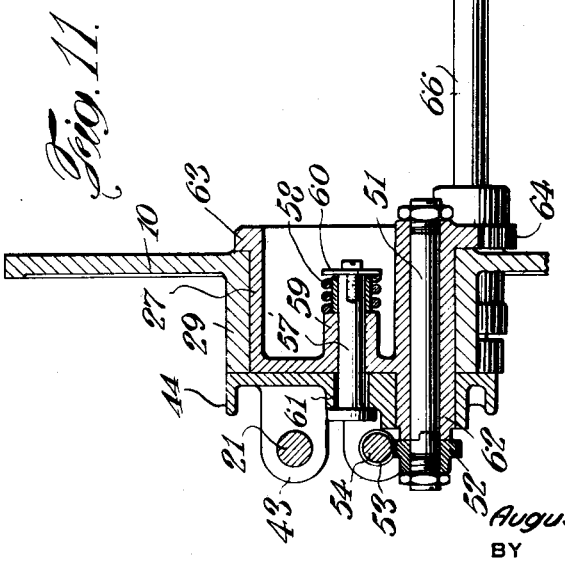

Patented Apr. 17, 1934

1,955,379

UNITED STATES PATENT OFFICE 1,955,379

FRAMING MECHANISM FOR MOTION PICTURE PROJECTORS

Augusto Dina, Elizabeth, N. J., assignor to International Projector Corporation, New York, N. Y., a corporation of Delaware Application July 2, 1930, Serial No. 465,349

20 Claims. (Cl. 88—17)

This invention relates to motion picture apparatus and has particular reference to a new and useful and improved mechanism for framing the film and driving the shutter whether the machine be a projector or a camera or other film carrying device.

This invention is related to the inventions described in my co-pending applications as follows:

Serial No. 440,727 filed April 1, 1930 and entitled "Compound operating mechanism for motion picture projection machines".

Serial No. 440,728 filed April 1, 1930 and entitled "Mechanical movement for motion picture machines".

An important object of the invention herein is to provide a novel type of film sprocket and shutter driving mechanism that is simple and reliable and which has minimum friction but which at all times permits the framing of the film and the adjusting of the shutter without varying the relations of the film sprocket driving portion of the mechanism. Some portions of the structure herein simulate some of the structures in the co-pending applications noted above.

A further object of the invention is to provide a simple, efficient, and compact framing mechanism which will permit instant and ready framing even while the machine is running, and which can easily and readily be operated by the operator with least effort and expenditure of time on his part and with a high degree of accuracy and with a fineness of adjustment desirable on any high grade machine.

A still further object is to provide a simple and efficient mechanism whereby the framing of the film with respect to the film gate or aperture may be simply, easily, and effectively achieved without affecting in any material manner the cyclic relations which exist in timing between the framing mechanism and the shutter timing mechanism. In other words, the timing of the shutter with respect to the optical beam and operating mechanism is not affected by the framing or adjustment of the film.

Further and more specific objects, features, and advantages will more clearly appear from the detailed description given below when taken in connection with the accompanying drawings which form part of the specification and which illustrate one present preferred form of the invention.

Briefly, the invention concerns the provision of a main driving shaft directly connected to the shutter shaft of a motion picture projector or similar machine. The shutter shaft is direct y geared to the pin wheel shaft of an intermittent mechanism of the machine with the governing flywheel mounted on and driven with the pin wheel shaft. The intermittent mechanism is disposed in a box or housing or frame which may be rotated so that the pin wheel shaft moves around the center of the box in a predetermined arc of movement. On the machine is another and practically similar box or housing containing a shaft on which is a fixed gear. This latter shaft is located exactly the same distance from the center of its box and moves in the same arc. Means are provided to connect to the two boxes or housings so that as the one with the fixed gear is moved or rotated the other will be moved in the same direction and to the same extent. The fixed gear on the second housing is meshed with a control shaft by means of a straight rack of cylindrical type and this control shaft is connected with the shutter shaft so that the movement of the shutter shaft as to turning or angular movement thereof is controlled. The mechanism which rotates one or the other box or housing is so related and associated with the other mechanism that the pin wheel position may be changed and in so doing the position of the associated star wheel and the film sprocket can be altered to frame or change the sprocket position with respect to its position regarding outside fixed elements such as the film gate which is fixed and this can be done without changing the relations between the pin wheel, the star wheel, and the shutter shaft as to their instantaneous time at the instant of changing and even during the framing change. The control shaft comes into effect to permit the change thus described without changing the angular position of the shutter. The disposition and position of the control shaft is such that it can be turned or rotated itself to independently turn the shutter when desired to change its time relations with respect to the intermittent mechanism or with respect to the projection beam of light when desired.

The present preferred form of the invention is illustrated in the accompanying drawings in which, Fig. 1 is a side elevation of the projector, looking toward the side on which the framing mechanism is shown;

Fig. 3 is a front elevation of the projector;

Fig. 4 is an enlarged side elevation of the framing mechanism;

Fig. 5 is a plan view of the mechanism shown in Fig. 4;

Fig. 6 is a partial vertical longitudinal section taken through the framing mechanism on the line 6—6 of Fig. 5;

Fig. 7 is a partial vertical longitudinal section taken through the framing mechanism on the line 7—7 of Fig. 5;

Fig. 8 is a vertical transverse section taken on the line 8—8 of Fig. 5;

Fig. 9 is a vertical longitudinal section taken on the line 9—9 of Fig. 8;

Fig. 10 is a vertical transverse section taken on the line 10—10 of Fig. 4; and

Fig. 11 is a vertical transverse section taken on the line 11—11 of Fig. 5.

Figure 1:
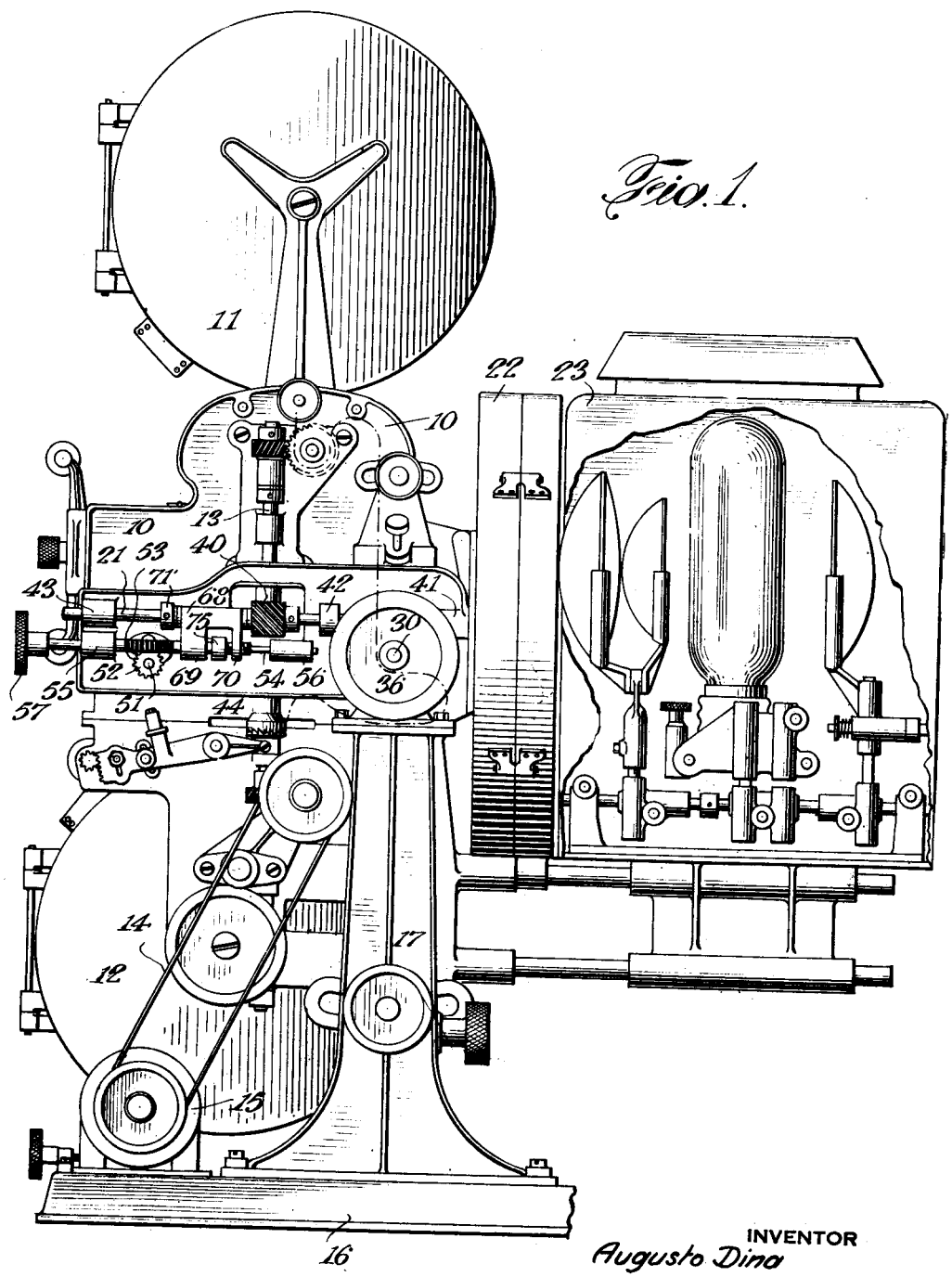
Figure 2:
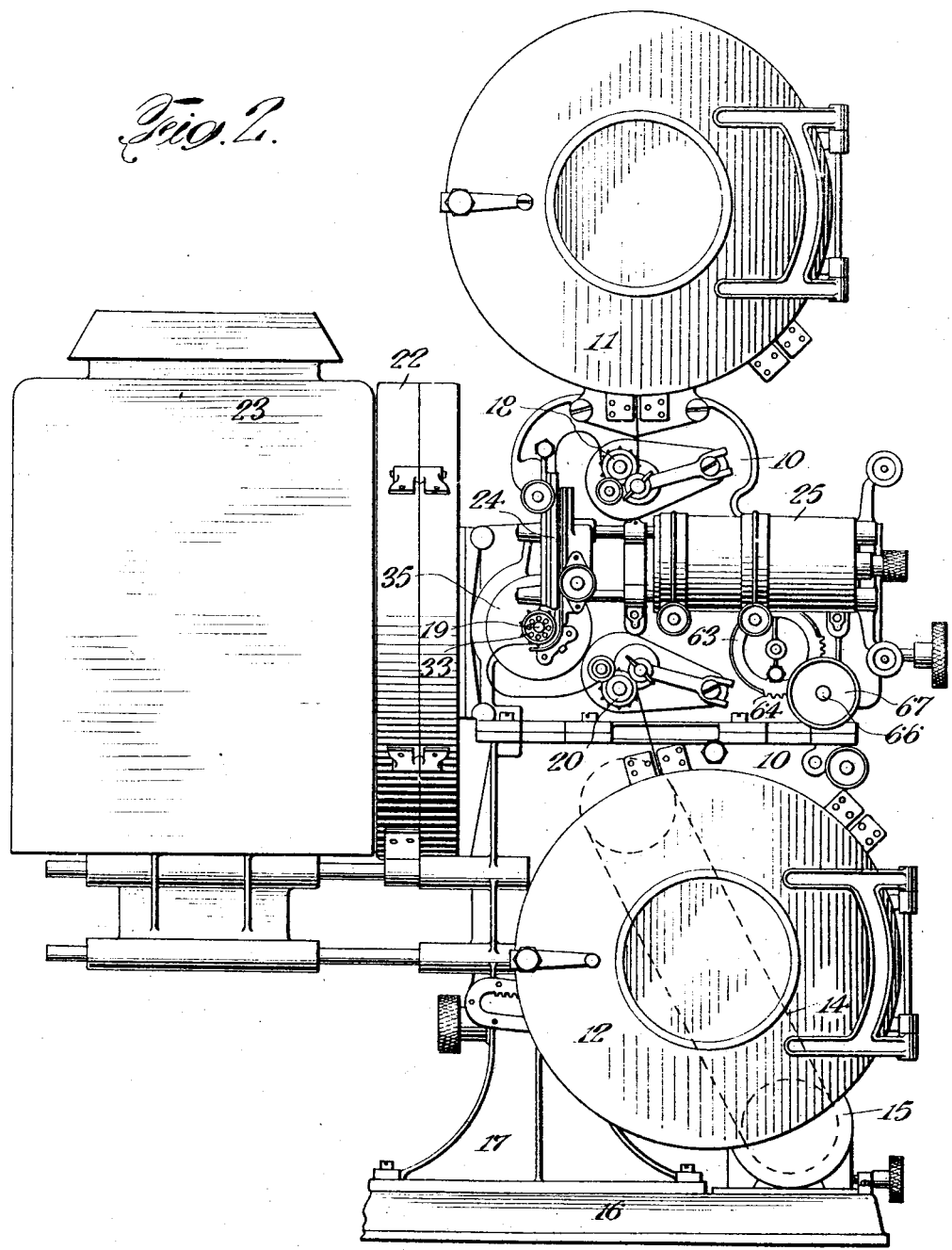
Fig. 2 is a side elevation looking toward the opposite side.

As shown in the drawings, the present preferred form of the invention is applied to a motion picture projector, the projection head of which has a central mechanism-supporting partition or wall 10. This apparatus includes the usual upper film magazine 11 mounted on the wall 10, the lower film magazine 12 also mounted on the wall 10. The main drive shaft 13 is vertically disposed and actuated through suitable gearing from the belt 14 connected to the driving motor 15 fixed to the base 16. This base 16 has a pedestal 17 rising therefrom, in a manner not shown in this application. The head wall or partition with all the mechanism supported thereon is pivotally mounted on the pedestal 17 so as to swing around the pivot point. This point or axis in one preferred instance is the axis of the intermittent film driving sprocket, and thus the intermittent sprocket and mechanism become the mechanical center of the machine with the consequent reduction of the vibration which usually occurs in projectors. Also mounted on the wall 10 are the upper film sprocket 18, the intermittent film sprocket 19, the lower film sprocket 20, the shutter shaft 21, the shutter guard casing 22, the lamp house assembly 23, the film gate 24, and the lens combination unit 25.

The drive of the mechanism including the shutter shaft 21 and the operation of the intermittent mechanism and its adjustment for the purpose of framing the film are to be hereinafter described. The mechanism therefor is particularly shown in details in Figs. 4 to 11 inclusive. Mounted on the head wall or partition 10 in spaced relation are two circular housings or rotatable boxes 26 and 27 and they are disposed in suitable journals 28 and 29 formed in the wall 10. The journal 28 on the wall 10 is housed in another journal 28' formed in the pedestal member 17 and this construction permits the partition 10 and all the supported mechanism to be rotated about the center of this journal member 28' on the pedestal for the reasons and purposes above mentioned. These journals 28 and 29 are open both at the front and the rear and the boxes or rotatable members 26 and 27 are snugly disposed therein. As shown in Fig. 8 the box 26 is chambered and rotatably receives a shaft 30 on one end of which is a pin wheel 31 of the usual intermittent mechanism. This pin wheel meshes with a star wheel 32 mounted on a shaft 33 disposed centrally of the axis of the box 26 and journalled in a sleeve 34 on a plate 35 fastened to a face of the journal member 28. On the outer end of the shaft 33 there is fastened the usual intermittent film sprocket 19 above mentioned.

On the other end of the pin wheel shaft 30 there is disposed a fly wheel 36 which regulates and smooths the motion of the intermittent mechanism. Also a gear 37 preferably a worm gear is disposed on the shaft 30 adjacent the fly wheel 36. This worm gear 37 meshes with a worm 38 on the shutter shaft 21 above mentioned. The shutter shaft 21 is driven directly from the drive shaft 13 by means of the meshing of the gear 39 on the drive shaft with a gear 40 on the shutter shaft 21. These last two gears are preferably of the worm type. This shutter shaft 21 is journalled at spaced points along its length in journal elements such as 41, 42, and 43 which are disposed on one face of the plate 44. This plate 44 is disposed across the faces of the journals 28 and 29 and is respectively connected to the boxes 26 and 27. This plate is connected to the box 26, as seen in Fig. 8 by means of a headed pin shaft 45 journalled in a sleeve 46 fastened to the box 26. The other end of the shaft 45 has a head 47 and a spring 48 extends between the head 47 and the sleeve 46 tending to keep the plate 44 snugly against the face of the boxes 26 and 27. The pin shaft 45 passes through a curved slot 49 in the plate 44 the diameter of the slot and the curvature thereof being equal to the distance between the pin wheel shaft and the center of the axis of the box 26. It will also be noted that the plate 44 is supported on a sleeve 50 which extends from the box 26 and also acts as a journal for the pin wheel shaft 30.

Referring now to the box 27 it will be seen especially in Fig. 11 that this box 27 is journalled in the journal element 29 on the head wall 10. This box receives therein a shaft 51 which is fixed therein independent for rotation integral with the box 27. The shaft 51 has on one end a gear 52 fixed thereon. This gear meshes with a gear 53 on a control shaft 54. This shaft 54 is journalled on the plate 44 in journals 55 and 56 as seen in Figs. 4 and 7. One end of the control shaft 54 has an operating handle 57 thereon. The gear 53 is preferably a straight rack gear as seen in Fig. 4. It will be observed that the control shaft 54 and the shutter shaft 21 are at different levels on the plate 44 altho they are both horizontal. It will also be noticed that the boxes 26 and 27 are both of the same diameter and that the arc of swing of the pin wheel shaft 30 and the arc of swing of the shaft 51 are the same altho the boxes are not at the same horizontal level on the plate 44. Therefore when the box 27 is rotated, its connection with the plate 44 will rotate the box 26 and will swing the pin wheel shaft 30 through the same arc as that through which the shaft 51 is swung by the movement of the box 27. The plate 44 is constrained to be disposed against the face of the box 27 by means of the pin shaft 57' to hold the plate 44 in position and having a spring 58 between the sleeve 59 and the collar 60 on the inner end of this shaft 57. The pin shaft 57' passes through a curved slot 61 in the plate 44 which slot is similar in curvature and size to the slot 49 previously mentioned as disposed in the plate 44. Also it will be observed that a sleeve 62 extends from the box 27 through the plate 44 and acts as further support therefor. One face of the box 27 is provided with a flange 63 the lower portion of which is provided with teeth 64 engaged by teeth on a gear 65 on a shaft 66 journaled on the partition 10 and having an end operating handle 67 to turn it. When the shaft 66 is turned then the box 27 is rotated.

Referring to Figs. 4 and 6 particularly, it will be seen that the control shaft 54 is connected to the shutter shaft 21 by means of a yoke member having a main body portion 68 and two opposite spaced legs or limb portions 69 and 70. The yoke 68 is held in position on shaft 21 by means of a set screw 71, which extends into a slight slot in the shaft 21 so that the yoke can be slightly adjusted along the shaft 21 if desired. The yoke member 68 is further held in position by means of collars 71' and by ring washers such as 72 and 73, disposed at opposite sides thereof. One of the legs 70 is threaded and engages with threads 74 on the shaft 54 at that point so that as the shaft 54 is turned by the handle 57 the yoke member 68 may be moved longitudinally and the shaft 21 thus turned angularly as will be hereinafter explained. A collar 75 fixed to the shaft 54 between the legs 69 and 70 will prevent too much movement of the yoke member 68 in either direction.

*Operation*

With the parts in the position shown in Figs. 4 and 6 which can be called a neutral position, I will assume that it is desired to frame the film with respect to the film gate 24. When it is desired to do this, the handle 67 is turned. This handle acting through the intermediary of the gear 65 turns the box 27. The plate 44 being supported on gear 52 and the shaft 51. The connection of the plate 44 with the sleeve 50 will cause the box 26 to rotate around its center and will cause the sleeve 50 and the pin wheel shaft 30 to move in an arc with the axis of the box 26 as the center. This will tend to rotate the shaft 33 and the sprocket 19 to frame the film.

As the box 27 is rotated around the center, the gear 52 which is fixed therein will turn with the box and will roll along the teeth 53 on the control shaft 54 slightly raising the control shaft as the plate 44 is slightly raised and lowered in its swinging motion. The connection of the control shaft 54 with the shutter shaft 21 through the yoke 68 will prevent the shutter shaft from moving any substantial amount longitudinally and will therefore cause the gear 37 to roll over the worm 38 as the pin wheel shaft 30 with the gear 37 is swung with the box 26. Since the gear 52 and the gear 37 are of the same diameter and have the same arc of swing the rolling movement of the gear 52 over the teeth 53 will exactly be similar to the rolling movement of the gear 37 over the worm 38. Since the gear 52 is fixed to the box 27 and does not turn independently thereof, it will be seen that the movement of the gear and the pin wheel shaft will thus be with the box 26 and not separate therefrom. Therefore the angular relations between the pin wheel shaft and the box 26 will not be changed as the film is framed and therefore the internal relations between the pin wheel 31 and the star wheel 32 are not changed during the framing action. Also the shutter shaft in its position and timing relations to the intermittent mechanism during framing is not changed. So the inter system cyclic relations are not changed during framing altho the extra-system cyclic relations of the sprocket 19 are changed with regard to a point outside the system, namely the film gate.

When it is desired to turn the shutter shaft 21 to change the timing of the shutter with respect to the other elements of the system, then it becomes necessary to turn the control shaft 54 through the intermediary of the handle 57. This turning causes the movement of the yoke 68 by means of the threads 74. This longitudinal movement of the shutter shaft 21 will cause the worm 38 to ride over the worm gear 37 and this relative motion will cause the worm 38 to turn slightly and this will cause the turning of the shutter shaft 21, the amount of turning of the handle 57 determining the amount to which the shutter shaft is turned as desired.

Thus, this improved drive and framing device provides a simple and direct connection between the shutter shaft and the pin wheel shaft. The pin wheel shaft carries the fly wheel and is swung around a definite arc with the shutter. The shutter shaft is prevented from turning during this swinging movement by means of the control shaft which swings in exactly the same arc and is connected to the shutter shaft. The pin wheel is prevented from turning with respect to the star wheel by forcing it to roll over the shutter shaft worm with a pure rolling action which is forced by the connection with the control shaft the motion of which is controlled by the mesh between the gear 52 and the teeth 53.

While the invention has been described in detail and with respect to the present preferred form thereof, it is not to be limited to such details and forms since many changes may be made and the invention embodied in other forms and modifications without departing from the spirit and scope of the invention in its broadest aspects. Hence it is desired to cover any and all forms and modifications of the invention coming within the language or scope of any one or more of the appended claims.

What is claimed, is,

1. In a framing device for motion picture machines, a pair of spaced casings or boxes, a pin wheel shaft disposed off center in one box, a gear on said pin wheel shaft, a shutter shaft, a gear on said shutter shaft, meshing with the gear on the pin wheel shaft, a gear non-rotatably fixed to the second box, means connecting the boxes for joint movement, means for rotating one of said boxes, a control shaft, said control shaft engaging the fixed gear, and means connecting the control and the shutter shafts.

2. In a framing device for motion picture machines, a pair of spaced casings or boxes, one of the boxes housing an intermittent mechanism including an offset pin wheel shaft, an equally offset shaft non-rotatably fixed to the second box, means for rotating one of said boxes, means for connecting the boxes for joint rotation, a shutter shaft directly geared to the pin wheel shaft, a control shaft directly geared to the fixed shaft, and means connecting the shutter and the control shafts.

3. In a framing device for motion picture machines, a pair of spaced casings or boxes, equally offset shafts on said boxes, the shaft on one box rotatable thereon, the shaft on the other box fixed therein, means for rotating the boxes together to swing the shafts, a control shaft engaging the fixed shaft, a shutter shaft engaging the shaft on the other box, and means connecting the control and the shutter shafts.

4. In a framing device for motion picture machines, a pair of spaced casings or boxes, equally offset shafts on said boxes, the shaft on one box rotatable thereon, the shaft on the other box fixed thereon, means for rotating the boxes together to swing the shafts, a control shaft on the other box, means connecting the control and the shutter shafts, and means for driving the shutter shaft.

5. In a framing device for motion picture machines, a pair of spaced casings or boxes, equally offset shafts on said boxes, the shaft on one box rotatable thereon, the shaft on the other box fixed thereon, means for rotating the boxes together to swing the shafts, a control shaft engaging the fixed shaft, a shutter shaft engaging the shaft on the other box, means connecting the control and the shutter shafts, and means for turning the control shaft independent of the swinging movement of the boxes.

6. In a framing device for motion picture machines, a pair of spaced casings or boxes, equally offset shafts on said boxes, the shaft on one box rotatable thereon, the shaft on the other box fixed thereon, means for rotating the shafts together to swing the shafts, a control shaft engaging the fixed shaft, a shutter shaft engaging the shaft on the other box, means connecting the control and the shutter shafts, means for driving the shutter shaft, and means for turning the control shaft independent of the swinging movement of the boxes.

7. In a framing device for motion picture machines, a rotatable intermittent box or casing, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed in said second box and offset equally from the center thereof, a plate connecting the boxes and movable therewith, the shutter shaft journalled on said plate, a control shaft journalled on said plate, a gear on said control shaft, a gear on the fixed non-rotatable shaft and meshing with it, a yoke member connecting the shutter and the control shafts, and threaded means connecting the yoke and the control shaft to permit the movement of the control shaft to adjust the shutter shaft independent of the rotation of the boxes.

8. In a framing device for motion picture machines, a rotatable intermittent box or casing a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed in said second box and offset equally from the center thereof, a plate connecting the boxes and movable therewith, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke and the control shaft to permit movement of the control shaft to adjust the shutter shaft independent of the rotation of the boxes, and means for driving the shutter shaft.

9. In a framing device for motion picture machines, a rotatable intermittent casing or box, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed on said second box, and offset equally from the center thereof, a plate connecting the boxes and movable therewith, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke and the control shaft to permit the movement of the control shaft to adjust the shutter shaft independent of the rotation of the boxes, and means for rotating one of said boxes.

10. In a framing device for motion picture machines, a rotatable intermittent casing or box, a pin wheel shaft rotatably offset therein, a worm gear on the pin wheel shaft, a shutter shaft, a worm on said shutter shaft meshing with the worm gear on the pin wheel shaft, a second rotatable casing or box, a shaft non-rotatably fixed on said second box, and offset equally from the center thereof, a plate connecting the boxes and movable therewith, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke member and the control shaft to permit the movement of the control shaft to adjust the shutter shaft independent of the rotation of the boxes.

11. In a framing device for motion picture machines, a rotatable intermittent box or casing, a pin wheel shaft rotatably offset therein, a worm gear on the pin wheel shaft, a shutter shaft, a worm on said shutter shaft meshing with the worm gear on the pin wheel shaft, a second rotatable casing or box, a shaft non-rotatably fixed on said second box, and offset equally from the center thereof, a plate connecting the boxes and movable therewith, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke member and the control shaft to permit the movement of the control shaft to adjust the shutter shaft independently of the rotation of the boxes, and means for driving the shutter shaft.

12. In a framing device for motion picture machines, a rotatable intermittent box or casing, a pin wheel shaft rotatably offset therein, a regulating flywheel on said pin wheel shaft, a gear on said pin wheel shaft, a shutter shaft, a gear on said shutter shaft, meshing with the gear on the pin wheel shaft, a second rotatable casing or box, a shaft non-rotatably fixed on said second box and offset equally from the center thereof, a plate connecting the boxes and movable therewith, the shutter shaft journalled on said plate, a control shaft journalled on said plate, a gear on said control shaft, a gear on the fixed non-rotatable shaft and meshing therewith, a yoke member connecting the shutter and the control shafts, and threaded means connecting the yoke member and the control shaft to permit movement of the control shaft to adjust the shutter shaft independent of the rotation of the boxes.

13. In a framing device for motion picture machines, a rotatable intermittent box or casing, a pin wheel shaft rotatably offset therein, a regulating flywheel on said pin wheel shaft, a gear on the pin wheel shaft, a shutter shaft, a gear on said shutter shaft meshing with the gear on the pin wheel shaft, a second rotatable casing or box, a shaft non-rotatably fixed in said second box and offset equally from the center thereof, a plate connecting the boxes and movable therewith, the shutter shaft journalled on said plate, a control shaft journalled on said plate, a gear on said control shaft, a gear on the fixed non-rotatable shaft and meshing therewith, a yoke member connecting the shutter and the control shaft, threaded means connecting the yoke member and the control shaft to permit the movement of the control shaft to adjust the shutter shaft independent of the rotation of the boxes, and means for driving the shutter shaft.

14. In a framing device for motion picture machines, a rotatable intermittent box or casing, a pin wheel shaft rotatably offset therein, a gear on the pin wheel shaft, a shutter shaft, a gear on the shutter shaft meshing with the gear on the pin wheel shaft, a second rotatable casing or box, a shaft non-rotatably fixed on said second box, and offset equally from the center thereof, a plate connecting the boxes and movable therewith, the shutter shaft journalled on said plate, a control shaft journalled on said plate, a straight cylindrical rack on said control shaft, a gear fixed to the fixed non-rotatable shaft, said gear and rack meshing with each other, a yoke member connecting the shutter and the control shafts, and threaded means connecting the yoke member and the control shaft to permit movement of the control shaft to adjust the shaft of the shutter independent of the rotation of the boxes.

15. In a framing device for motion picture machines, a rotatable intermittent box or casing, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed on said second box and offset equally from the center thereof, a plate connecting the boxes and movable therewith, the shutter shaft journalled on said plate, a control shaft journalled on said plate, a straight cylindrical rack on said control shaft, a gear fixed to the fixed non-rotatable shaft, said gear and rack meshing with each other, a yoke member connecting the shutter shaft and the control shaft, to permit movement of the control shaft to adjust the shutter shaft independent of the rotation of the boxes, and means for driving the shutter shaft.

16. In a framing device for motion picture machines, a rotatable intermittent box or casing, a pin wheel shaft rotatably offset thereon, a gear on the pin wheel shaft, a shutter shaft, a gear on said shutter shaft meshing with the gear on the pin wheel shaft, a second rotatable casing or box, a shaft non-rotatably fixed on said second box and offset equally from the center thereof, a plate connecting the boxes and movable therewith, the shutter shaft journalled on said plate, a control shaft journalled on said plate, a straight cylindrical rack on said control shaft, a gear fixed to the fixed non-rotatable shaft, said gear and rack meshing with each other, a yoke member connecting the shutter and the control shafts to permit movement of the control shaft to adjust the shutter shaft independent of the rotation of the boxes, means for driving the shutter shaft, and a regulating fly wheel on the pin wheel shaft.

17. In a framing device for motion picture machines, a rotatable intermittent box or casing, a pin wheel shaft rotatably offset thereon, a gear on the pin wheel shaft, a shutter shaft, a gear on said shutter shaft meshing with the gear on the pin wheel shaft, a second rotatable casing or box, a shaft non-rotatably fixed on said second box, and offset equally from the center thereof, a plate connecting the boxes and movable therewith, the shutter shaft journalled on said plate, a control shaft journalled on said plate, a gear on said control shaft, a gear on the fixed non-rotatable shaft meshing with the gear on the control shaft, the gear on the fixed shaft being of the same diameter as the gear on the pin wheel shaft, a yoke member connecting the shutter and control shafts, threaded means connecting the yoke member and the control shaft to permit movement of the control shaft to adjust the shutter shaft independent of the rotation of the boxes, and means for rotating one of said boxes.

18. In a framing device for motion picture machines, a rotatable intermittent casing or box, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed on said second box, and offset equally from the center thereof, a plate connecting the boxes and movable therewith, the shutter shaft being journalled on said plate, a control shaft journalled on said plate, a gear on said control shaft, a gear on the fixed non-rotatable shaft meshing with the gear on the control shaft, the gear on the fixed shaft being of the same diameter as the gear on the pin wheel shaft, a yoke member connecting the shutter and the control shafts, threaded means connecting the yoke member and the control shaft to permit movement of the control shaft to adjust the shutter shaft independent of the rotation of the boxes, means for rotating one of the boxes, and means for driving the shutter shaft.

19. In a framing device for motion picture machines, a rotatable intermittent box or casing, a pin wheel shaft rotatably offset therein, a gear on the pin wheel shaft, a regulating flywheel on the pin wheel shaft, a shutter shaft, a gear on said shutter shaft meshing with the gear on the pin wheel shaft, a second rotatable casing or box, a shaft non-rotatably fixed on said second box, and offset equally from the center thereof, a plate connecting the boxes and movable therewith, the shutter shaft being journalled on said plate, a control shaft journalled on said plate, a gear on said control shaft, a gear on the fixed non-rotatable shaft meshing with the gear on the control shaft, the gear on the fixed shaft being of the same diameter as the gear on the pin wheel shaft, a yoke member connecting the shutter and the control shafts, threaded means connecting the yoke member and the control shaft to permit the movement of the control shaft to adjust the shutter shaft independent of the rotation of the boxes, means for rotating one of said boxes, and means for driving the shutter shaft.

20. In a framing device for motion picture machines, a rotatable intermittent box or casing, a pin wheel shaft rotatably offset therein, a worm gear on the pin wheel shaft, a regulating flywheel on the pin wheel shaft, a shutter shaft, a worm on the shutter shaft meshing with the worm gear on the pin wheel shaft, a second rotatable casing or box, a shaft non-rotatably fixed on said second box, and offset equally from the center thereof, a plate connecting the boxes and movable therewith, the shutter shaft being journalled on said plate, a control shaft journalled on said plate, a gear on said control shaft, a gear on the fixed non-rotatable shaft meshing with the gear on the control shaft, the gear on the fixed shaft being of the same diameter as the worm gear on the pin wheel shaft, a yoke member connecting the shutter and the control shafts, threaded means connecting the shutter and the control shafts to permit movement of the control shaft to adjust the shutter independent of the rotation of the boxes, means for rotating one of said boxes, and means for driving the shutter.

AUGUSTO DINA.